(12) United States Patent
Ellanti

(10) Patent No.: US 8,489,319 B2
(45) Date of Patent: Jul. 16, 2013

(54) NAVIGATION SYSTEM WITH VIDEO AND METHOD OF OPERATION THEREOF

(75) Inventor: Manohar Ellanti, Fremont, CA (US)

(73) Assignee: Telenav, Inc., Sunnyvale, CA (US)

( * ) Notice: Subject to any disclaimer, the term of this patent is extended or adjusted under 35 U.S.C. 154(b) by 286 days.

(21) Appl. No.: 12/607,810

(22) Filed: Oct. 28, 2009

(65) Prior Publication Data

US 2011/0098911 A1  Apr. 28, 2011

(51) Int. Cl.
*G01C 7/00* (2006.01)

(52) U.S. Cl.
USPC ............................................... 701/400

(58) Field of Classification Search
None
See application file for complete search history.

(56) References Cited

U.S. PATENT DOCUMENTS

| | | |
|---|---|---|
| 6,223,125 B1 | 4/2001 | Hall |
| 6,327,522 B1 | 12/2001 | Kojima et al. |
| 6,356,812 B1 * | 3/2002 | Cragun .............................. 701/1 |
| 6,405,132 B1 | 6/2002 | Breed et al. |
| 6,775,614 B2 | 8/2004 | Kim |
| 7,353,110 B2 | 4/2008 | Kim |
| 2002/0022927 A1 * | 2/2002 | Lemelson et al. ............. 701/301 |
| 2003/0112132 A1 | 6/2003 | Trajkovic et al. |
| 2005/0237224 A1 * | 10/2005 | Gotfried ......................... 340/929 |
| 2006/0250224 A1 | 11/2006 | Steffel et al. |
| 2007/0061076 A1 * | 3/2007 | Shulman ........................ 701/213 |
| 2008/0046175 A1 * | 2/2008 | Tengler et al. ................. 701/210 |
| 2008/0106436 A1 | 5/2008 | Breed |
| 2008/0243378 A1 * | 10/2008 | Zavoli ............................ 701/209 |
| 2008/0309762 A1 | 12/2008 | Howard et al. |
| 2009/0083100 A1 | 3/2009 | Darby, Jr. et al. |
| 2009/0177359 A1 | 7/2009 | Ihara et al. |
| 2010/0194886 A1 * | 8/2010 | Asari et al. ..................... 348/148 |
| 2011/0098911 A1 * | 4/2011 | Ellanti ............................ 701/200 |

FOREIGN PATENT DOCUMENTS

| | | |
|---|---|---|
| EP | 0 473 866 B1 | 5/2000 |
| WO | WO 92/21116 A1 | 11/1992 |

OTHER PUBLICATIONS

International Search Report for Application No. PCT/US2010/054365 dated Dec. 20, 2010.

* cited by examiner

*Primary Examiner* — Thomas Tarcza
*Assistant Examiner* — Adam Alharbi

(57) ABSTRACT

A method of operation of a navigation system includes: detecting a surrounding view for detecting an object at a traffic lane to the left or the right of a device as well as in the front or at the rear of the device; presenting the surrounding view for displaying on the device; and generating an alert with a detection of the object at or exceeding a threshold.

20 Claims, 10 Drawing Sheets

NAVIGATION SYSTEM WITH VIDEO AND METHOD OF OPERATION THEREOF

TECHNICAL FIELD

The present invention relates generally to a navigation system, and more particularly to a system for a navigation system with video.

BACKGROUND ART

Modern portable consumer and industrial electronics provide increasing levels of functionality to support modern life including location-based information services. This is especially true for client devices such as navigation systems, cellular phones, portable digital assistants, and multifunction devices.

As users adopt mobile location-based service devices, new and old usage begin to take advantage of this new device space. There are many solutions to take advantage of this new device opportunity. One existing approach is to use location information to provide navigation services, such as a global positioning service (GPS) navigation system for a mobile device.

Navigation system and service providers are continually making improvement in the user's experience in order to be competitive. In navigation services, demand for better usability to help with safe driving is increasingly important.

If drivers take their eyes off the road even for a few seconds to see GPS navigation application screen, there would be danger of accident because they loose sight of the road. This problem will be amplified in future generation GPS navigation systems that use large screens and present rich set of navigation or other information.

The problem can occur when users interacting with navigation systems while parking or driving. The users commonly interact with navigation systems to perform task such as entering destination address details, searching for a desired destination like restaurant or hotel, or interacting with other features as may be enabled in the navigation systems. In all of these cases, interaction with the GPS navigation systems causes the users to loose sight of the road and around the vehicle.

In general, users get distracted while driving when the users operate navigation systems. Being distracted while operating vehicles may cause accidents whether on or off road. For instance, a user may have his/her car in the garage and notices that there is no object behind the car before interacting with the navigation system. He/she may spend some time entering a destination in the navigation system and then may back up the vehicle thinking that there is still no object behind the vehicle. While user was interacting with the navigation system, it is possible that another vehicle, a child, or any object can appear behind his/her vehicle.

Even though "while driving don't operate" warning may be provided in navigation systems, users are likely to look at the navigation systems and operate them. There are simple functions such as volume and brightness control that are useful and operated by the users while driving. There are more complex interactions as mentioned earlier that may also be performed by the users knowingly or unknowingly. In such cases, the users loose sight of the road and around the vehicle.

In response to consumer demand, navigation systems are providing ever-increasing amounts of information requiring these systems to improve usability. This information includes map data, business data, local weather, and local driving conditions. The demand for more information and the need for providing user-friendly experience to help with safe driving continue to challenge the providers of navigation systems.

Thus, a need remains for a navigation system to provide information with improvement in usability. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: detecting a surrounding view for detecting an object at a traffic lane to the left or the right of a device as well as in the front or at the rear of the device; presenting the surrounding view for displaying on the device; and generating an alert with a detection of the object at or exceeding a threshold.

The present invention provides a navigation system including: a speed-distance estimator module for detecting a surrounding view for detecting an object at a traffic lane to the left or the right of a device as well as in the front or at the rear of the device; a surrounding visual presentation module, coupled to the speed-distance estimator module, for presenting the surrounding view for displaying on the device; and an alert engine module, coupled to the speed-distance estimator module, for generating an alert with a detection of the object at or exceeding a threshold.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
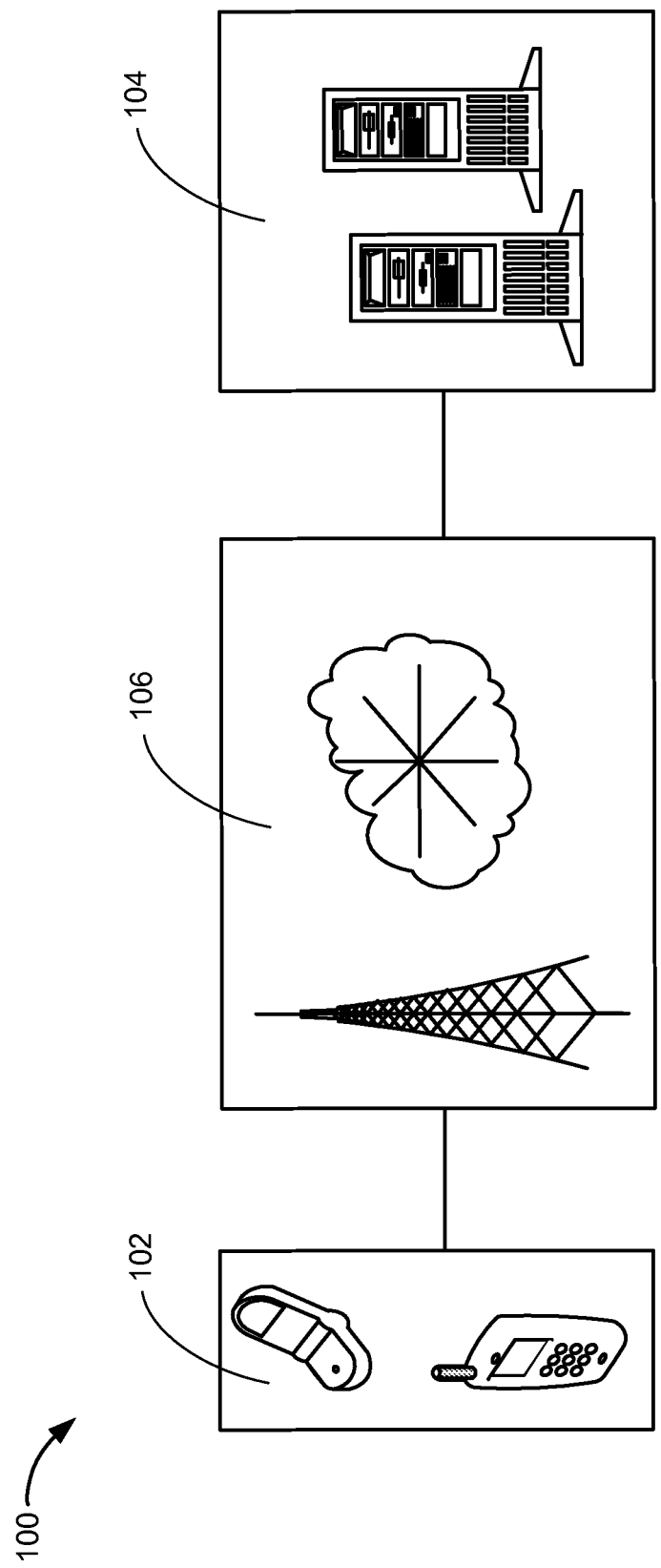
FIG. 1 is a navigation system with video in a first embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same or similar numbers are used in all the drawing FIGs. to relate to the same elements. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (x, y), where x and y are two ordinates that define the geographic location, i.e., a position of a user.

The navigation information is presented by longitude and latitude related information. The navigation information also includes a velocity element comprising a speed component and a direction component.

The term "navigation routing information" referred to herein is defined as the routing information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, or a combination thereof.

Referring now to FIG. 1, therein is shown a navigation system 100 with video in a first embodiment of the present invention. The navigation system 100 applies to any embodiment of the present invention described later. The navigation system 100 includes a first device 102, such as a client or a server. The first device 102 can be linked to a second device 104, such as a server or a client, with a communication path 106, such as wireless network, wired network, or a combination thereof.

The first device 102 can be of any of a variety of mobile devices or car head units. For example, the first device 102 can be a cellular phone, personal digital assistant, a notebook computer, or other multi-functional mobile communication or entertainment devices having means for coupling to the communication path 106.

The second device 104 can be any of a variety of centralized or decentralized computing devices. For example, the second device 104 can be a computer, a computer in a grid computing pool, a virtualized computer, a computer in a cloud computing pool, or a computer in a distributed computing topology. The second device 104 can include routing functions or switching functions for coupling with the communication path 106 to communicate with the first device 102.

As a further example, the second device 104 can be a particularized machine, such as a mainframe, a server, a cluster server, rack mounted server, or a blade server, or as more specific examples, an IBM System z10™ Business Class mainframe or a HP ProLiant ML™ server. Yet another example, the first device 102 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

The communication path 106 can be a variety of networks. For example, the communication path 106 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include personal area network (PAN), local area network (LAN), metropolitan area network (MAN), and wide area network (WAN).

For illustrative purposes, the navigation system 100 is shown with the first device 102 as a mobile computing device, although it is understood that the first device 102 can be different types of computing devices. For example, the first device 102 can be a mobile computing device, such as notebook computer, another client device, or a different type of client device.

Further for illustrative purposes, the second device 104 is shown in a single location, although it is understood that the server can be centralized or decentralized and located at different locations. For example, the second device 104 can represent real or virtual servers in a single computer room, distributed across different rooms, distributed across different geographical locations, embedded within a telecommunications network, virtualized servers within one or more other computer systems including grid or cloud type computing resources, or in a high powered client device.

Yet further for illustrative purposes, the navigation system 100 is shown with the first device 102 and the second device 104 as end points of the communication path 106, although it is understood that the navigation system 100 can have a different partition between the first device 102, the second device 104, and the communication path 106. For example, the first device 102, the second device 104, or a combination thereof can also function as part of the communication path 106.

Figure 2:
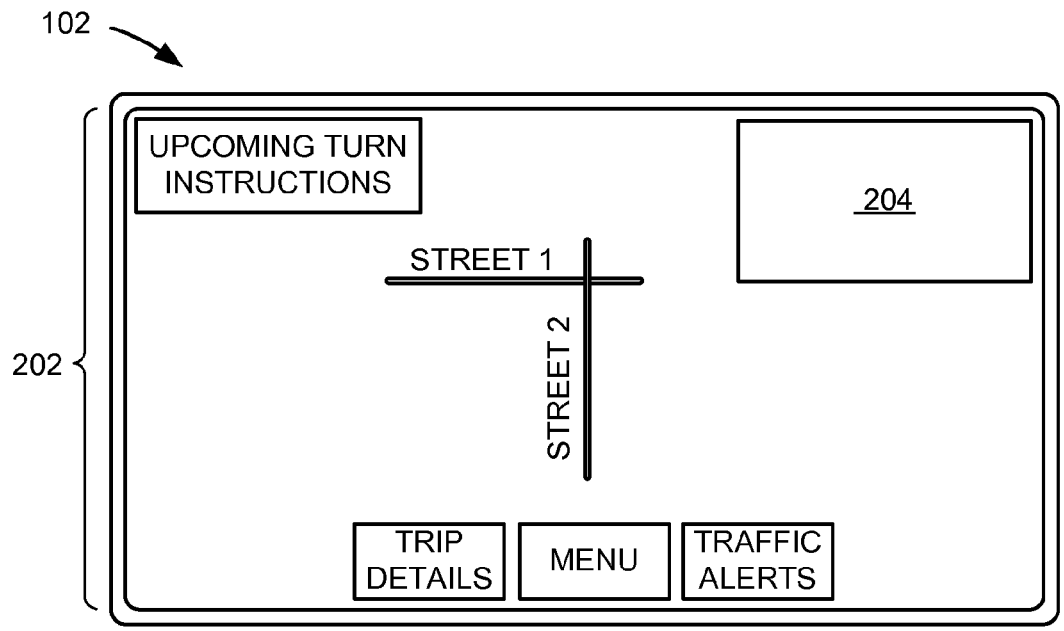
FIG. 2 is a screen shot of a first example of the first device.

Referring now to FIG. 2, therein is shown a screen shot of a first example of the first device 102. The screen shot can be displayed on the first device 102 or devices in other embodiments.

The screen shot depicts the first device 102 displaying a map screen 202, which can include a representation of a geographic location, a position of a user, or a route desired by the user, as examples. In the first example, the map screen 202 shows an intersection of "Street 1" and "Street 2" as an example. In addition, the map screen 202 can also allow users to select navigation options such as "Trip Details", "Menu", and "Traffic Alerts", as examples.

The screen shot depicts a surrounding view 204, which can include a visual presentation of an area around a vehicle. The surrounding view 204 can include real time video of a vehicle's surrounding.

For illustrative purposes, the screen shot depicts the surrounding view 204 in the upper-right corner of the map screen 202, although it is understood that the surrounding view 204 can be shown in any corner or anywhere in the map screen 202. For example, the surrounding view 204 can be shown in upper-left corner of the map screen 202.

Figure 3:
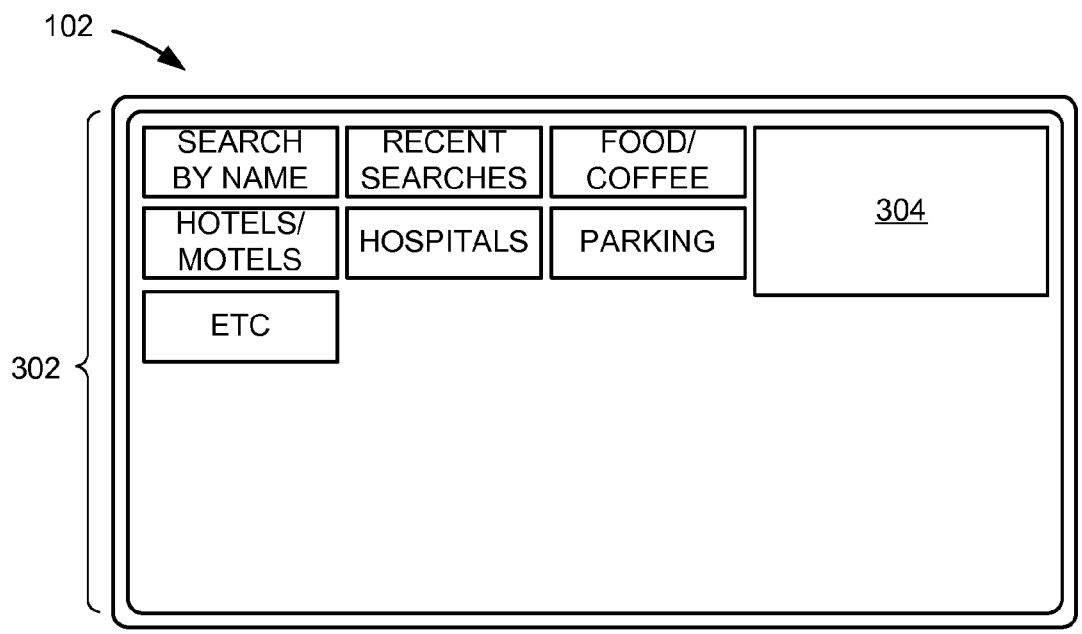
FIG. 3 is a screen shot of a second example of the first device.

Referring now to FIG. 3, therein is shown a screen shot of a second example of the first device 102. The screen shot can be displayed on the first device 102 or devices in other embodiments.

The screen shot depicts the first device 102 displaying a search screen 302. In the second example, the search screen 302 allows users to select navigation options such as "Search by Name", "Recent Searches", and "Food/Coffee", "Hotels/Motels", "Hospitals", "Parking", or "Etc".

The screen shot depicts a surrounding view 304, which can include a visual presentation of an area around a vehicle. The surrounding view 304 can include real time video of a vehicle's surrounding.

For illustrative purposes, the screen shot depicts the surrounding view 304 in the upper-right corner of the search screen 302, although it is understood that the surrounding view 304 can be shown anywhere in the search screen 302. For example, the surrounding view 304 can be shown in upper-left corner of the search screen 302.

Figure 4:
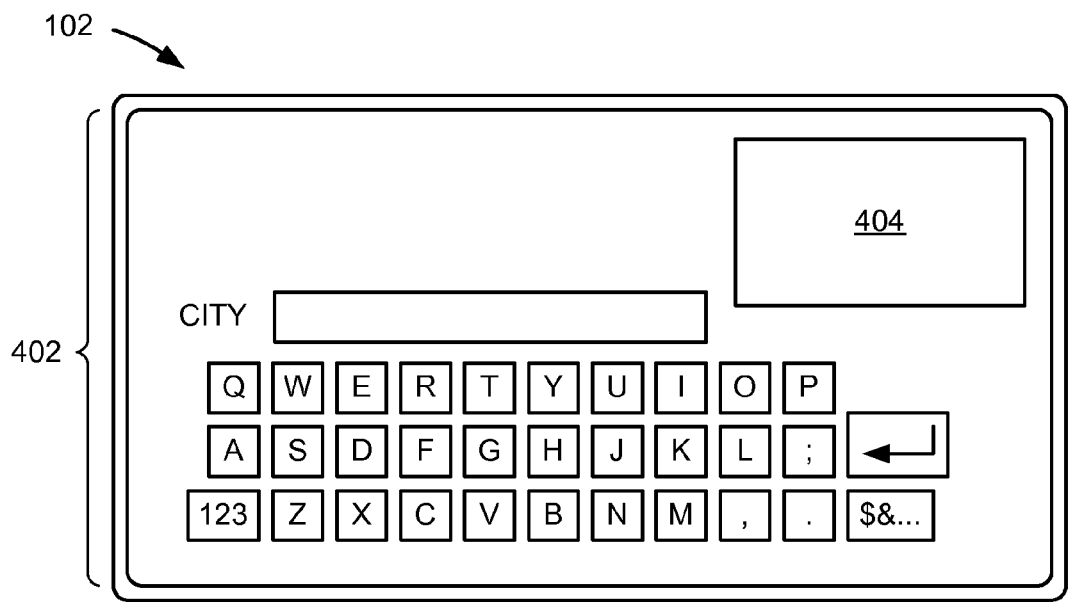
FIG. 4 is a screen shot of a third example of the first device.

Referring now to FIG. 4, therein is shown a screen shot of a third example of the first device 102. The screen shot can be displayed on the first device 102 or devices in other embodiments.

The screen shot depicts the first device 102 displaying an input screen 402. In the third example, the input screen 402 provides a keyboard and allows users to enter a city name, as an example.

The screen shot depicts a surrounding view 404, which can include a visual presentation of an area around a vehicle. The surrounding view 404 can include real time video of a vehicle's surrounding.

For illustrative purposes, the screen shot depicts the surrounding view 404 in the upper-right corner of the input screen 402, although it is understood that the surrounding view 404 can be shown anywhere in the input screen 402. For example, the surrounding view 404 can be shown in upper-left corner of the input screen 402.

Figure 5:
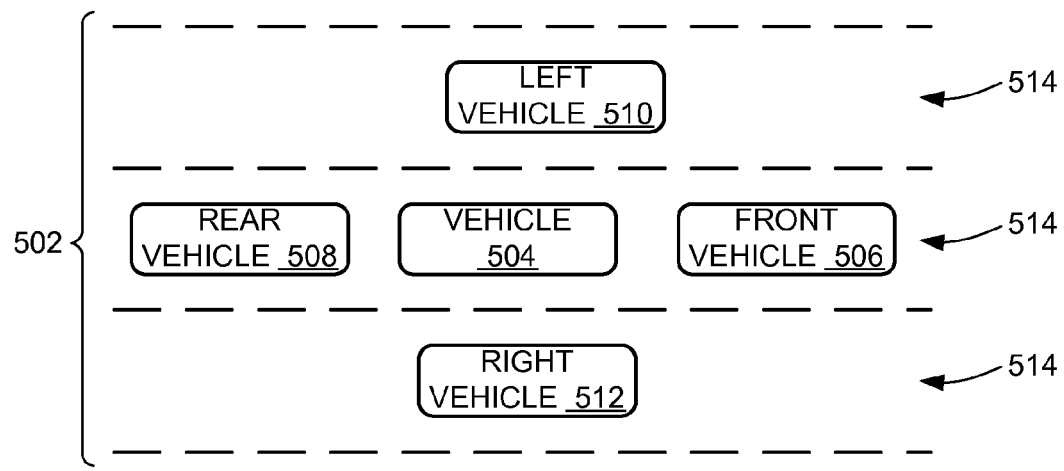
FIG. 5 is an example of a surrounding view.

Referring now to FIG. 5, therein is shown an example of a surrounding view 502. The surrounding view 502 can include a visual presentation of an area around a vehicle in which a navigation system is operated.

The surrounding view 502 can include real time video of the vehicle's surrounding. The surrounding view 502 depicted can represent an example of the surrounding view 204 of FIG. 2, the surrounding view 304 of FIG. 3, and the surrounding view 404 of FIG. 4.

The screen shot depicts a vehicle 504. The screen shot depicts objects, which include a front vehicle 506, a rear vehicle 508, a left vehicle 510, and a right vehicle 512, shown at front, rear, left, and right of the vehicle 504, respectively. The surrounding view 502 can include visual representation of the area around the vehicle 504.

The surrounding view 502 can include real time video from one or more cameras, sensors, or any combination thereof provided at one or more sides at front, rear, left, and right sides of the vehicle 504. The surrounding view 502 can include the front vehicle 506 and the rear vehicle 508 moving in the same direction of the vehicle 504. The surrounding view 502 can include the left vehicle 510, the right vehicle 512, or a combination thereof moving in the same or different direction of the vehicle 504.

For illustrative purposes, the surrounding view 502 includes the front vehicle 506, the rear vehicle 508, the left vehicle 510, and the right vehicle 512, although it is understood that the surrounding view 502 can include any object at front, rear, left, and right sides of the vehicle 504. For example, the surrounding view 502 can include a light pole or a bicycle in the front or the rear of the vehicle 504, respectively.

The surrounding view 502 can include depth of objects in the front, rear, left, and right of the vehicle 504. With real time video from cameras, the surrounding view 502 can include an augmented view of the area around the vehicle 504 that is better than or at least similar to a view that a user would normally see if his/her attention is on the road.

The objects in the surrounding view 502 can be detected. The objects can be detected at a traffic lane 514, which can include a portion of a road or a way for the movement of vehicles. For example, the traffic lane 514 is defined by painted lines.

For example, an object at the traffic lane 514 to the left or the right of the vehicle 504 (or the first device 102) can include the left vehicle 510 or the right vehicle 512, respectively. Also for example, an object in the front or at the rear of the vehicle 504 (or the first device 102) can include the front vehicle 506 or the rear vehicle 508, respectively.

Figure 6:
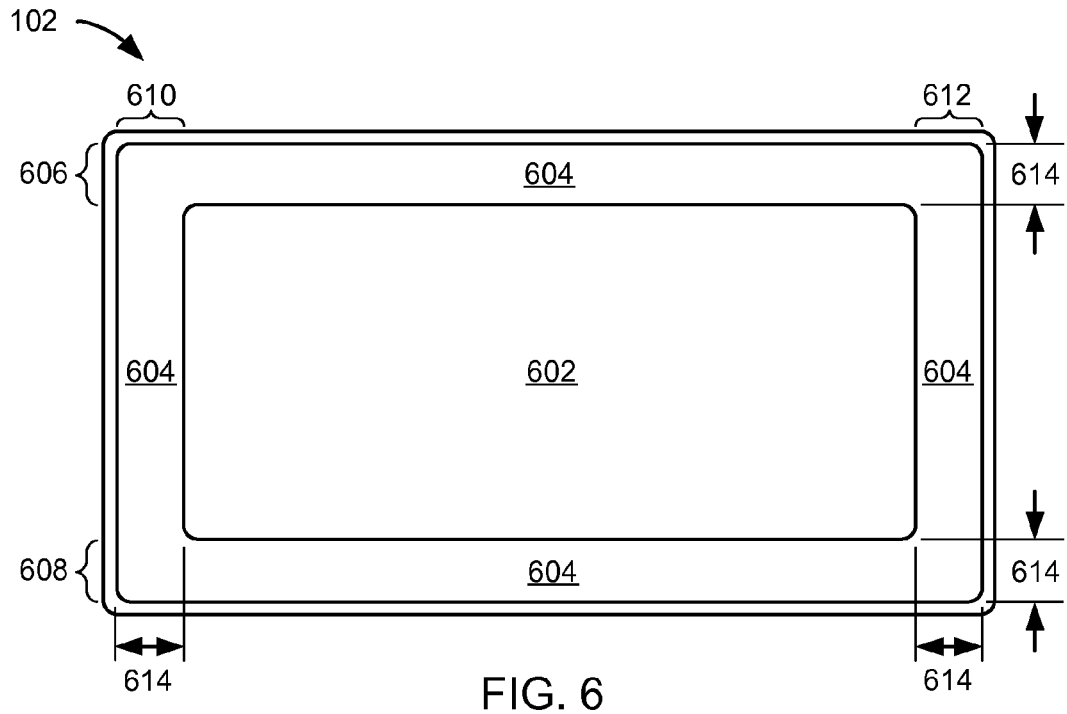
FIG. 6 is a screen shot of a fourth example of the first device.

Referring now to FIG. 6, therein is shown a screen shot of a fourth example of the first device 102. The screen shot can be displayed on the first device 102 or devices in other embodiments.

The screen shot depicts the first device 102 displaying a main presentation view 602 of a navigation application. For example, the main presentation view 602 can include the map screen 202 of FIG. 2, the search screen 302 of FIG. 3, or the input screen 402 of FIG. 4.

The screen shot depicts presentation of the main presentation view 602 simultaneously with a surrounding view 604, which can include a visual presentation of an area around a vehicle. The surrounding view 604 can include a front view 606, a rear view 608, a left view 610, and a right view 612 displayed above, below, left, and right of the main presentation view 602, respectively. The front view 606, the rear view 608, the left view 610, and the right view 612 are depicted in a way that naturally aligns with the front, rear, left, and right sides of typical vision.

The front view 606, the rear view 608, the left view 610, and the right view 612 can include an area around a vehicle. For example, the front view 606, the rear view 608, the left view 610, and the right view 612 can include an area at front, rear, left, and right sides of the vehicle 504 of FIG. 5, respectively.

The surrounding view 604, having a width 614, can be displayed around and outside of the perimeter of the main presentation view 602. The width 614 can be predetermined to provide spacing or area for the main presentation view 602. The width 614 can be the same or different among the front view 606, the rear view 608, the left view 610, and the right view 612.

Figure 7:
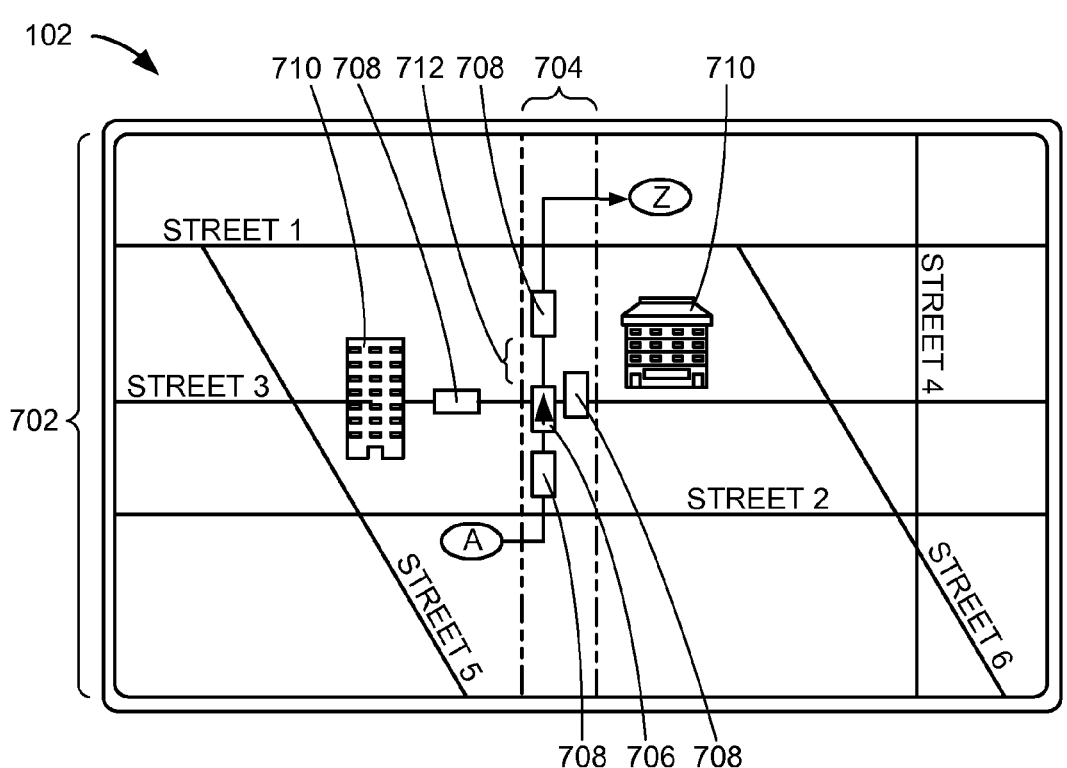
FIG. 7 is a screen shot of a fifth example of the first device.

Referring now to FIG. 7, therein is shown a screen shot of a fifth example of the first device 102. The screen shot can be displayed on the first device 102 or devices in other embodiments.

The screen shot depicts the first device 102 displaying a map screen 702, which can include a representation of a geographic location, a position of a user, or a route desired by the user, as examples. In the fifth example, the map screen 702 shows a surrounding view 704, which can include a visual presentation of an area around a vehicle 706.

The screen shot depicts the surrounding view 704 merged into or part of the map screen 702. The surrounding view 704 can include real time video of an area surrounding the vehicle 706 based on cameras, sensors, or a combination thereof. The surrounding view 704 can provide a sense of objects, such as vehicles, people, street signs, light poles, and animals, around the vehicle 706.

The surrounding view 704 can provide a useful view including the position of an object 708, such as a vehicle, a person, a street sign, a light pole, a barricade, a landmark, a moving object, or a stationary object, as examples, in the front, rear, left, and right sides of the vehicle 706. The surrounding view 704 can allow the user to adjust his/her speed when a relative distance 712 of the vehicle 706 is getting too close to the object 708. If applicable, speed of the object 708 can be shown.

For illustrative purposes, the surrounding view 704 depicts an arrow representing the current location of the vehicle 706, although it is understood that the representation can include other indicators, colors, shapes, or a combination thereof. For example, the surrounding view 704 can include an asterisk for representing the current location of the vehicle 706.

The surrounding view 704 can allow users to see multi-lane roads more clearly. Also, the surrounding view 704 can present a true view of a road to correct errors in navigation map data such as incorrect number of lanes, road description, or road condition. For example, a lane of a road is not a car pool lane in the navigation map data but it is actually a car pool lane shown in the surrounding view 704.

The surrounding view 704 can allow users to query a landmark 710, which can include anything that is recognizable such as a building, monument, or any other structure. The landmark 710 recognized in the surrounding view 704 can be displayed on the map screen 702 based on the relative distance 712 from the vehicle 706. The landmark 710 can be queried by having the users click or select the landmark 710 on the map screen 702, allowing users to get more details without typing name or address of the landmark 710.

For illustrative purposes, the screen shot depicts the landmark 710 that can be shown and recognized in the surrounding view 704, although it is understood that the screen shot can include any recognizable location which can include point of interest or listing as an example. For example, a hotel that is shown in the surrounding view 704 can be recognized and displayed on the map screen 702, allowing users to query to get more details about the hotel shown.

Figure 8:
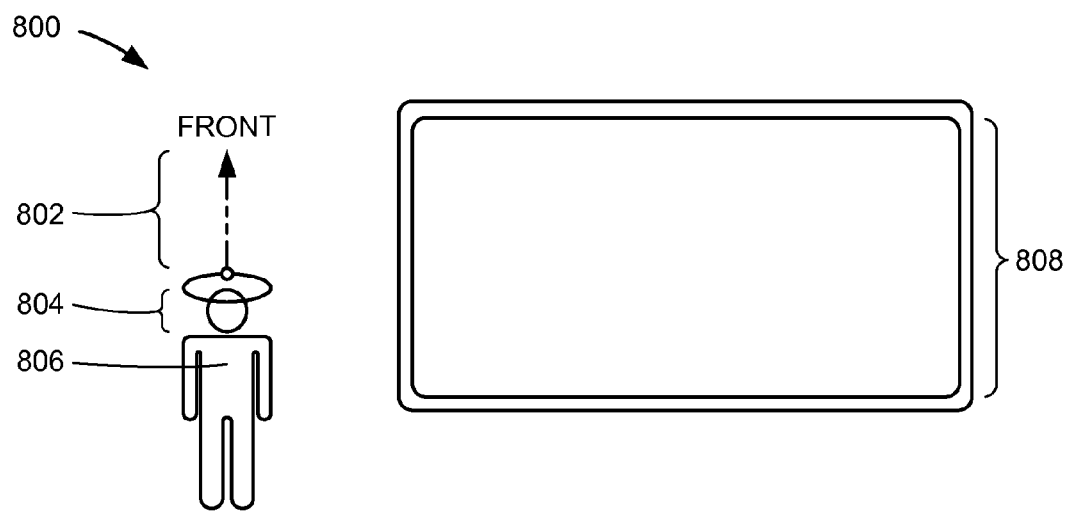
FIG. 8 is an illustration of a portion of a navigation system with video in a normal attention state.

Referring now to FIG. 8, therein is shown an illustration of a portion of a navigation system 800 with video in a normal attention state 802. The normal attention state 802 can include a user's attention 804 in a state of focusing on the road in front of a vehicle.

The user's attention 804 can include a state of mind of a user 806 while he/she operates the vehicle. For example, the user's attention 804 can include the user 806 focusing on the road or looking at a screen 808 of the navigation system 800. The navigation system 800 can represent the navigation system 100 of FIG. 1 or any navigation system in other embodiments.

The illustration depicts the user 806 of the navigation system 800 in the normal attention state 802. The normal attention state 802 can include the user 806 not looking at the screen 808 of the navigation system 800. As an example, the screen 808 can include the map screen 202 of FIG. 2, the search screen 302 of FIG. 3, or the input screen 402 of FIG. 4.

Figure 9:
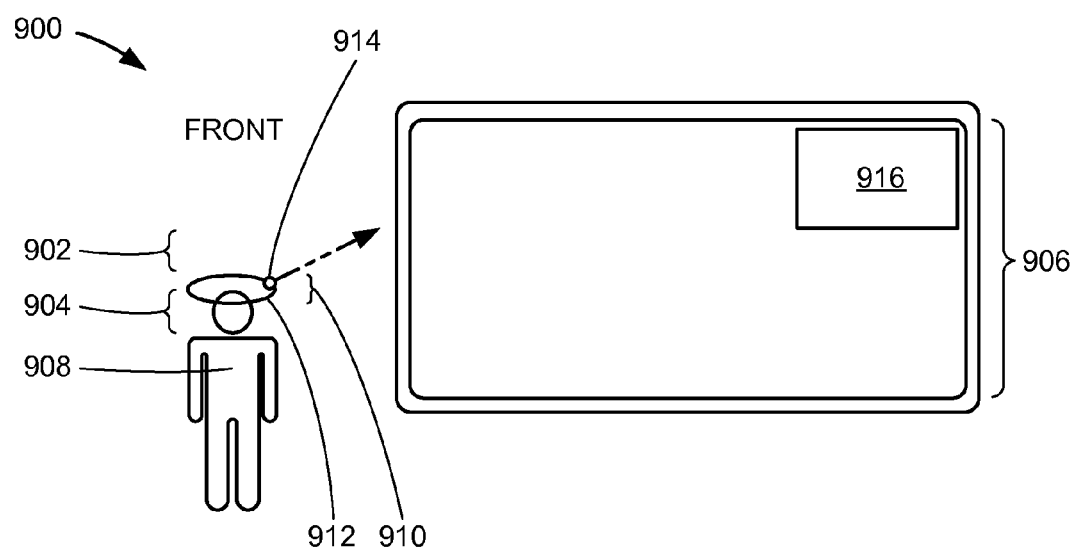
FIG. 9 is an illustration of a portion of a navigation system with video based on a diverted attention state.

Referring now to FIG. 9, therein is shown an illustration of a portion of a navigation system 900 with video based on a diverted attention state 902. The diverted attention state 902 can include a user's attention 904 in a state of not focusing on the road in front of the vehicle 706 of FIG. 7 but instead looking at a screen 906 of the navigation system 900. As an example, the screen 906 can include the map screen 202 of FIG. 2, the search screen 302 of FIG. 3, or the input screen 402 of FIG. 4.

The user's attention 904 can include a state of mind of a user 908 while he/she operates a vehicle. For example, the user's attention 904 can include a state of focusing on the road or a state of looking at the screen 906 of the navigation system 900. The navigation system 900 can represent the navigation system 100 of FIG. 1 or any navigation system in other embodiments.

The navigation system 900 can sense whether the user's attention 904 is in the normal attention state 802 of FIG. 8 or the diverted attention state 902. The user's attention 904 can be sensed by providing a process that can include an attention detector 910 such as an eye locker, a motion sensor, or any other attention sensing device. The attention detector 910 can sense movement or motion of the head of the user 908 and detect if the user's attention 904 is in the normal attention state 802 of FIG. 8 or the diverted attention state 902.

As an application example, the illustration depicts the attention detector 910 as the eye locker, which can include a head ring 912 that has a sensor 914 such as an infrared (IR) sensor, camera, or reflector. The head ring 912 can be worn on the head of the user 908.

The eye locker can sense the user's attention 904. The eye locker can detect the user's attention 904 is in the diverted attention state 902 when the user 908 turns his/her head to look at the screen 906. As an example, the sensor 914 with infrared technology can recognize an image of the screen 906 and determine that the user 908 is looking at the screen 906.

Also as an application example, the navigation system 900 can include the motion detector, which can include a device that senses head movement of the user 908. For example, the motion detector can sense movement of the head of the user 908 by optical means for detecting a change in the images captured by a camera.

The motion detector can be integrated into an earpiece with a wireless technology such as Bluetooth, Infrared Data Association standard (IrDA), wireless fidelity (WiFi), or worldwide interoperability for microwave access (WiMAX). The motion detector can enable the earpiece to beam a signal including a control for presenting a surrounding view 916, which can include a visual presentation of an area around a vehicle in which the navigation system 900 is operated.

Based on the diverted attention state 902, the navigation system 900 can display the surrounding view 916 near the perimeter of the screen 906, which can include a section or a corner of the screen 906. As an example, the surrounding view 916 can include the surrounding view 204 of FIG. 2, the surrounding view 304 of FIG. 3, or the surrounding view 404 of FIG. 4.

Based on the diverted attention state 902, the navigation system 900 can display the surrounding view 916 around and outside of the perimeter of the main presentation view 602 of FIG. 6. As an example, the surrounding view 916 can include the surrounding view 604 of FIG. 6.

Based on the diverted attention state 902, the navigation system 900 can display the surrounding view 916 merged into the map screen 702 of FIG. 7. As an example, the surrounding view 916 can include the surrounding view 704 of FIG. 7.

Figure 10:
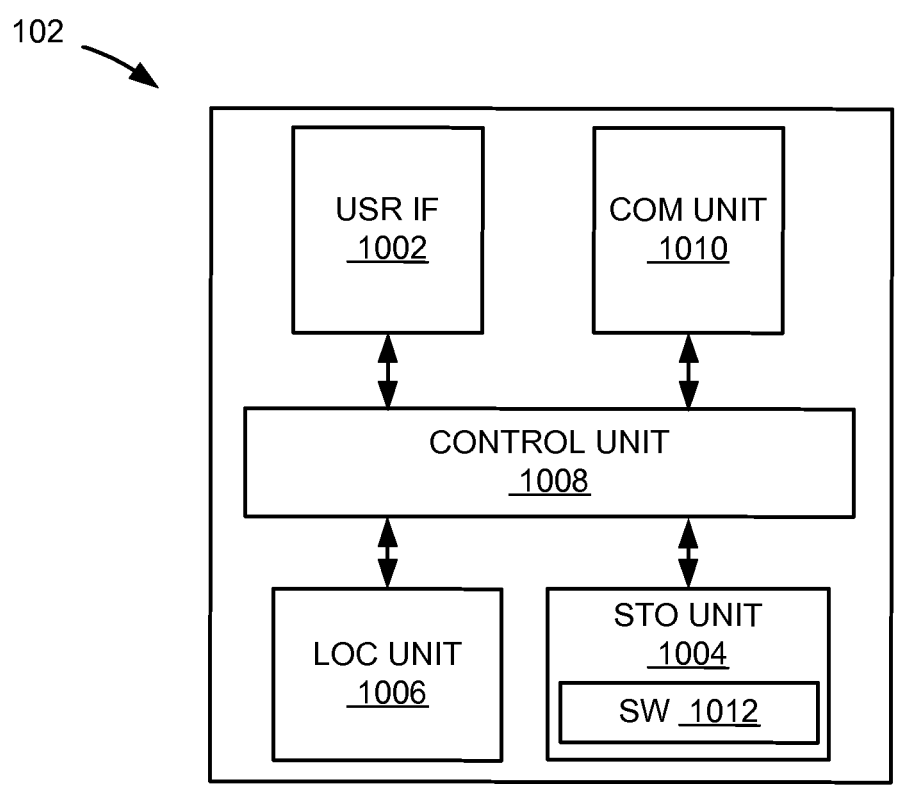
FIG. 10 is a block diagram of the first device of the navigation system.

Referring now to FIG. 10, therein is shown a block diagram of the first device 102 of the navigation system 100 of FIG. 1. For example, the first device 102 can be any of a variety of devices, such as a cellular phone, a personal digital assistant, a notebook computer, or an entertainment device. The first device 102 can be a standalone device, or can be incorporated with a vehicle, for example a car, truck, bus, or train.

As a further example, the first device 102 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

The first device 102 can include a user interface 1002, a storage unit 1004, a location unit 1006, and a control unit 1008, such as a processor, an embedded processor, a microprocessor, a hardware control logic, a hardware finite state machine (FSM), a digital signal processor (DSP), a communication unit 1010, or a combination thereof. The user interface 1002 can interface with an input device and an output device.

Examples of the input device of the user interface 1002 can include a keypad, a touchpad, soft-keys, a keyboard, a microphone, or any combination thereof to provide data and communication inputs. Examples of the output device of the user interface 1002 can include a display, a projector, a video screen, a speaker, or any combination thereof.

The control unit 1008 can execute a software 1012 and can provide the intelligence of the first device 102. The control unit 1008 can operate the user interface 1002 to display information generated by the first device 102. The control unit 1008 can also execute the software 1012 for the other functions of the first device 102, including receiving location information from the location unit 1006.

The control unit 1008 can execute the software 1012 for interaction with the communication path 106 of FIG. 1 via the communication unit 1010. The communication unit 1010 can include active and passive components, such as microelectronics or an antenna, for interaction with the communication path 106 of FIG. 1.

The location unit 1006 of the first device 102 can generate location information, current heading, and current speed of the first device 102, as examples. The location unit 1006 can be implemented in many ways. For example, the location unit 1006 can be a global positioning system (GPS), inertial navigation system, cell-tower location system, accelerometer location system, or any combination thereof.

The storage unit 1004 can store the software 1012. The storage unit 1004 can also store the relevant information, such as advertisements, points of interest (POI), navigation routing entries, or any combination thereof.

For illustrative purposes, the first device 102 is shown with the partition having the user interface 1002, the storage unit 1004, the location unit 1006, the control unit 1008, and the communication unit 1010 although it is understood that the first device 102 can have a different partition. For example, the location unit 1006 can be partitioned between the control unit 1008 and the software 1012.

A screen shot for the first device 102 can be represented by the screen shot of FIG. 2, FIG. 3, FIG. 4, FIG. 6, or FIG. 7. The first device 102 can perform a process including presenting a surrounding view including the surrounding view 204 of FIG. 2, the surrounding view 304 of FIG. 3, the surrounding view 404 of FIG. 4, the surrounding view 502 of FIG. 5, the surrounding view 604 of FIG. 6, the surrounding view 704 of FIG. 7, or the surrounding view 916 of FIG. 9.

Figure 11:
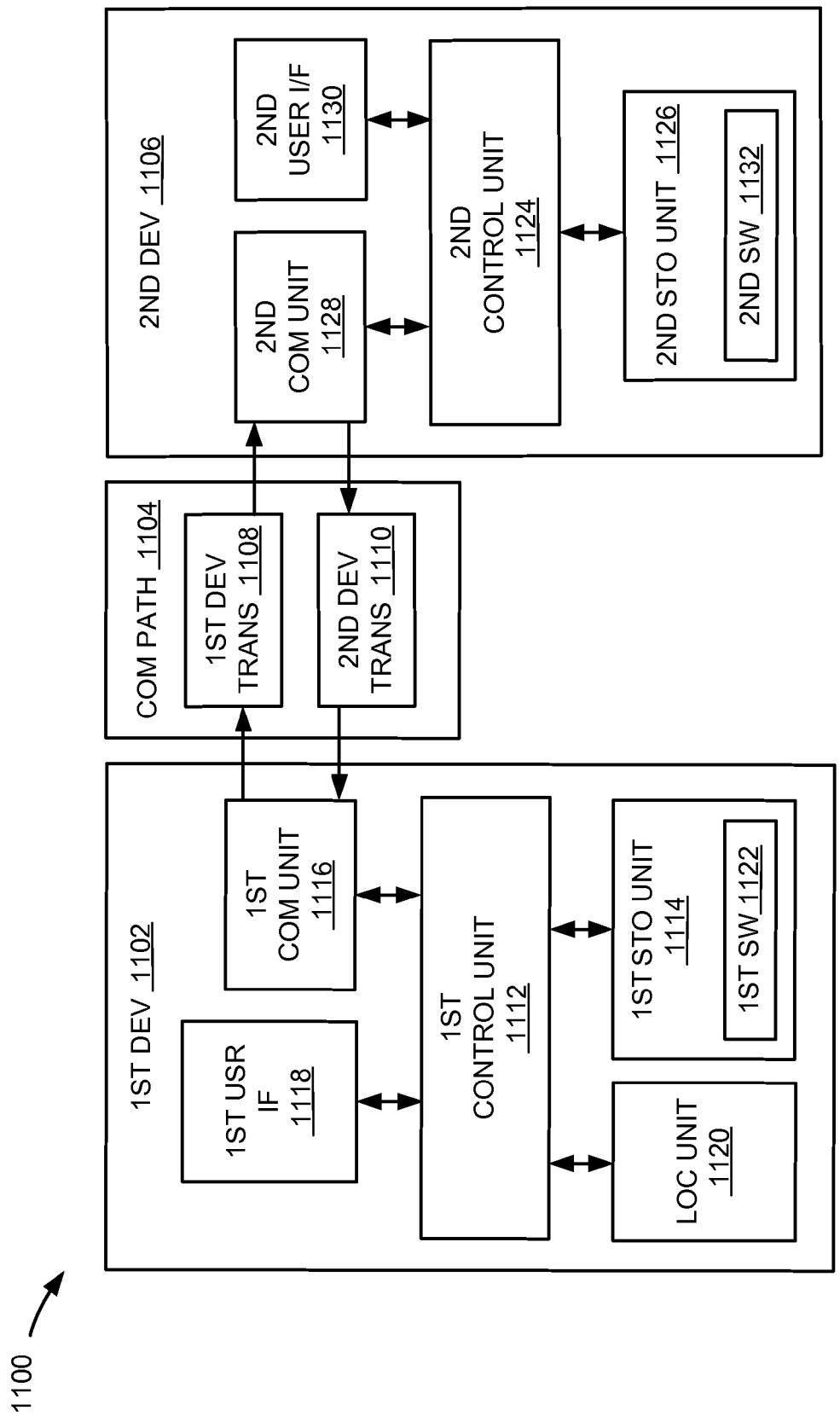
FIG. 11 is a block diagram of a navigation system with video in a second embodiment of the present invention.

Referring now to FIG. 11, therein is shown a block diagram of a navigation system 1100 with video in a second embodiment of the present invention. The navigation system 1100 can include a first device 1102, a communication path 1104, and a second device 1106.

The first device 1102 can communicate with the second device 1106 over the communication path 1104. For example, the first device 1102, the communication path 1104, and the second device 1106 can be the first device 102 of FIG. 1, the communication path 106 of FIG. 1, and the second device 104 of FIG. 1, respectively.

The first device 1102 can send information in a first device transmission 1108 over the communication path 1104 to the second device 1106. The second device 1106 can send information in a second device transmission 1110 over the communication path 1104 to the first device 1102. The first device transmission 1108 can include wireless network, wired network, or a combination thereof. The second device transmission 1110 can include wireless network, wired network, or a combination thereof.

For illustrative purposes, the navigation system 1100 is shown with the first device 1102 as a client device, although it is understood that the navigation system 1100 can have the first device 1102 as a different type of device. For example, the first device 1102 can be a server.

Also for illustrative purposes, the navigation system 1100 is shown with the second device 1106 as a server, although it is understood that the navigation system 1100 can have the second device 1106 as a different type of device. For example, the second device 1106 can be a client device.

As a further example, the second device 1106 can be a particularized machine, such as a mainframe, a server, a cluster server, rack mounted server, or a blade server, or as more specific examples, an IBM System z10™ Business Class mainframe or a HP ProLiant ML™ server. Yet another example, the first device 1102 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For brevity of description in this embodiment of the present invention, the first device 1102 will be described as a client device and the second device 1106 will be described as a server device. The present invention is not limited to this selection for the type of devices. The selection is an example of the present invention.

The first device 1102 can include, for example, a first control unit 1112, such as a processor, an embedded processor, a microprocessor, a hardware control logic, a hardware finite state machine (FSM), a digital signal processor (DSP), or a combination thereof, a first storage unit 1114, a first communication unit 1116, a first user interface 1118, and a location unit 1120. For illustrative purposes, the navigation system 1100 is shown with the first device 1102 described with discrete functional modules, although it is understood that the navigation system 1100 can have the first device 1102 in a different configuration. For example, the first control unit 1112, the first communication unit 1116, the first user interface 1118 may not be discrete functional modules but may have one or more of the aforementioned modules combined into one functional module.

The first control unit 1112 can execute a first software 1122 from the first storage unit 1114 and provide the intelligence of the first device 1102. The first control unit 1112 can operate the first user interface 1118 to display information generated by the navigation system 1100.

The first control unit 1112 can also execute the first software 1122 for the other functions of the navigation system 1100. For example, the first control unit 1112 can execute the first software 1122 for operating the location unit 1120.

The first storage unit 1114 can be implemented in a number of ways. For example, the first storage unit 1114 can be a volatile memory, a nonvolatile memory, an internal memory, or an external memory. The first storage unit 1114 can include the first software 1122.

The first control unit 1112 can execute the first software 1122 and can provide the intelligence of the first device 1102 for interaction with the second device 1106, the first user interface 1118, the communication path 1104 via the first communication unit 1116, and the location unit 1120. The first communication unit 1116 can include active and passive components, such as microelectronics or an antenna, for interaction with the communication path 1104.

The location unit 1120 of the first device 1102 can generate location reading, current heading, and current speed of the first device 1102, as examples. The location unit 1120 can be implemented in many ways. For example, the location unit 1120 can be a global positioning system (GPS), inertial navigation system, cell-tower location system, accelerometer location system, or any combination thereof.

The second device 1106 can include, for example, a second control unit 1124, such as a processor, an embedded processor, a microprocessor, a hardware control logic, a hardware finite state machine (FSM), a digital signal processor (DSP), or a combination thereof, a second storage unit 1126, a second communication unit 1128, and a second user interface 1130. For illustrative purposes, the navigation system 1100 is shown with the second device 1106 described with discrete functional modules, although it is understood that the navigation system 1100 can have the second device 1106 in a different configuration. For example, the second control unit 1124, the second communication unit 1128, and the second user interface 1130 may not be discrete functional modules but may have one or more of the aforementioned modules combined into one functional module.

The second storage unit 1126 can include a second software 1132 of the second device 1106. For illustrative purposes, the second storage unit 1126 is shown as a single element, although it is understood that the second storage unit 1126 can be a distribution of storage elements.

Also for illustrative purposes, the navigation system 1100 is shown with the second storage unit 1126 as a single hierarchy storage system, although it is understood that the navigation system 1100 can have the second storage unit 1126 in a different configuration. For example, the second storage unit 1126 can be formed with different storage technologies forming a memory hierarchal system including different levels of caching, main memory, rotating media, or off-line storage.

The second control unit 1124 can execute the second software 1132 and provide the intelligence of the second device 1106 for interaction with the first device 1102, the second user interface 1130, and the communication path 1104 via the second communication unit 1128. The first communication unit 1116 can couple with the communication path 1104 to send information to the second device 1106 in the first device transmission 1108. The second device 1106 can receive information in the second communication unit 1128 from the first device transmission 1108 of the communication path 1104.

The second communication unit 1128 can couple with the communication path 1104 to send information to the first device 1102 in the second device transmission 1110. The first device 1102 can receive information in the first communication unit 1116 from the second device transmission 1110 of the communication path 1104. The navigation system 1100 can be executed by the first control unit 1112, the second control unit 1124, or a combination thereof.

For illustrative purposes, the navigation system 1100 is shown with the modules of the navigation system 1100 operated by the first device 1102 and the second device 1106. It is to be understood that the first device 1102 and the second device 1106 can operate any of the modules and functions of the navigation system 1100. For example, the first device 1102 is shown to operate the location unit 1120, although it is understood that the second device 1106 can also operate the location unit 1120.

A screen shot for the navigation system 1100 can be represented by the screen shot of FIG. 2, FIG. 3, FIG. 4, FIG. 6, or FIG. 7. The navigation system 1100 can perform a process including presenting a surrounding view including the surrounding view 204 of FIG. 2, the surrounding view 304 of FIG. 3, the surrounding view 404 of FIG. 4, the surrounding view 502 of FIG. 5, the surrounding view 604 of FIG. 6, the surrounding view 704 of FIG. 7, or the surrounding view 916 of FIG. 9.

Figure 12:
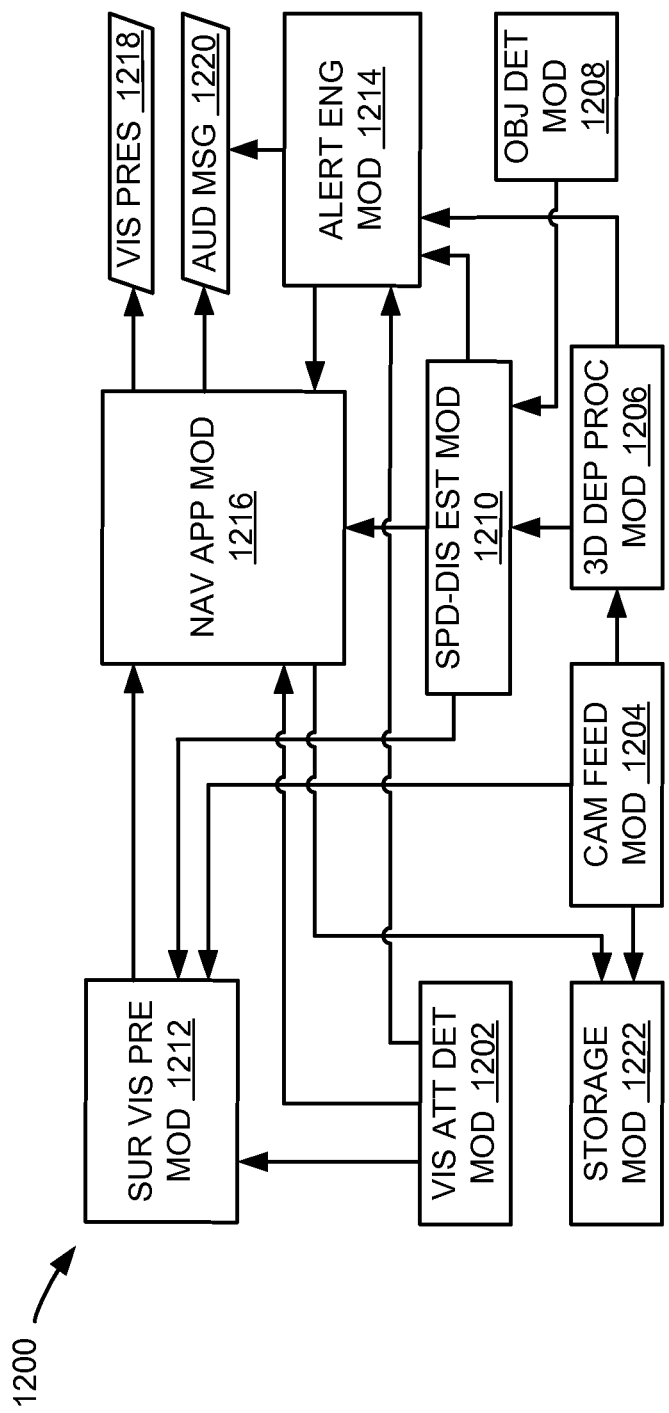
FIG. 12 is a block diagram of a navigation system with video in a third embodiment of the present invention.

Referring now to FIG. 12, therein is shown a block diagram of a navigation system 1200 with video in a third embodiment of the present invention. The navigation system 1200 can represent a navigation system including the navigation system 100 of FIG. 1, the first device 102 of FIG. 10, and the navigation system 1100 of FIG. 11.

A screen shot for the navigation system 1200 can be represented by the screen shot of FIG. 2, FIG. 3, FIG. 4, FIG. 6, or FIG. 7. The navigation system 1200 can perform a process including presenting a surrounding view including the surrounding view 204 of FIG. 2, the surrounding view 304 of FIG. 3, the surrounding view 404 of FIG. 4, the surrounding view 502 of FIG. 5, the surrounding view 604 of FIG. 6, the surrounding view 704 of FIG. 7, or the surrounding view 916 of FIG. 9.

The block diagram depicts a visual attention detector module 1202 having a function for sensing the normal attention state 802 of FIG. 8 or the diverted attention state 902 of FIG. 9. The function can be performed by identifying a known position as well as movement of the user's head. An apparatus such as the head ring 912 of FIG. 9 or the earpiece can provide an orientation or a movement of the user's head.

For example, the visual attention detector module 1202 can be implemented with the first device 102 of FIG. 10. The visual attention detector module 1202 can be implemented with the attention detector 910 of FIG. 9, the user interface 1002 of FIG. 10, the control unit 1008 of FIG. 10, the software 1012 of FIG. 10, or a combination thereof.

Also for example, the visual attention detector module 1202 can be implemented with the navigation system 1100 of FIG. 11. The visual attention detector module 1202 can be implemented with the attention detector 910 of FIG. 9, the first user interface 1118 of FIG. 11, the first control unit 1112 of FIG. 11, the first software 1122 of FIG. 11, or a combination thereof.

As an application example, the navigation system 1200 can include a motion detector, which can include a device that senses movement, integrated into an earpiece with a wireless technology such as Bluetooth, Infrared Data Association standard (IrDA), wireless fidelity (WiFi), or worldwide interoperability for microwave access (WiMAX). The motion detector can sense movement of the head of the user 908 of FIG. 9, enabling the earpiece to beam a signal including a control for presenting the surrounding view 916 of FIG. 9 on the screen 906 of FIG. 9. For example, the surrounding view 916 of FIG. 9 can include the surrounding view 204 of FIG. 2, the surrounding view 304 of FIG. 3, the surrounding view 404 of FIG. 4, the surrounding view 502 of FIG. 5, the surrounding view 604 of FIG. 6, or the surrounding view 704 of FIG. 7.

Also as an application example, the navigation system 1200 can include an eye locker, which can include the head ring 912 of FIG. 9 that has an infrared (IR) sensor, camera, or reflector with which the navigation system 1200 can sense the user 908 of FIG. 9 looking at the screen 906 of FIG. 9. The head ring 912 of FIG. 9 can be worn on the head of the user 908 of FIG. 9.

With the head ring 912 of FIG. 9 turned directly towards the screen 906 of FIG. 9, the navigation system 1200 can sense the user 908 of FIG. 9 looking at the screen 906 of FIG. 9 and not focusing on the road. Sensing that the user 908 of FIG. 9 is looking at the screen 906 of FIG. 9, the navigation system 1200 can present the surrounding view 916 of FIG. 9 on the screen 906 of FIG. 9.

The block diagram depicts a camera feed module 1204, which can include a function for receiving video data from one or more cameras installed on a vehicle. For example, the camera feed module 1204 can be implemented with the first device 102 of FIG. 10. The camera feed module 1204 can be implemented with the user interface 1002 of FIG. 10, the control unit 1008 of FIG. 10, the software 1012 of FIG. 10, or a combination thereof.

Also for example, the camera feed module 1204 can be implemented with the navigation system 1100 of FIG. 11. The camera feed module 1204 can be implemented with the first user interface 1118 of FIG. 11, the first control unit 1112 of FIG. 11, the first software 1122 of FIG. 11, or a combination thereof.

The camera feed module 1204 can interface with the cameras provided around the vehicle. The cameras can include in-depth cameras, three-dimensional cameras with infrared (IR) or other technologies, or two-dimensional cameras. The cameras can be provided for feeding real time video data.

The block diagram depicts a three-dimensional depth processor module 1206, which can include a function for calculating the distance between a vehicle, with the navigation system 1200 therein, and other objects such as vehicles, people, street signs, light poles, and animals. The three-dimensional depth processor module 1206 can be coupled to the camera feed module 1204.

For example, the three-dimensional depth processor module 1206 can be implemented with the first device 102 of FIG. 10. The three-dimensional depth processor module 1206 can be implemented with the control unit 1008 of FIG. 10, the software 1012 of FIG. 10, or a combination thereof.

Also for example, the three-dimensional depth processor module 1206 can be implemented with the navigation system 1100 of FIG. 11. The three-dimensional depth processor module 1206 can be implemented with the first control unit 1112 of FIG. 11, the first software 1122 of FIG. 11, or a combination thereof.

The three-dimensional depth processor module 1206 can receive video data from the camera feed module 1204. The three-dimensional depth processor module 1206 can process the video data to detect depth of the objects by calculating relative position of the objects around the vehicle.

The block diagram depicts an object detector module 1208, which can include a function for sensing the objects around a vehicle with the navigation system 1200 therein. For example, the object detector module 1208 can be implemented with the first device 102 of FIG. 10. The object detector module 1208 can be implemented with the user interface 1002 of FIG. 10, the control unit 1008 of FIG. 10, the software 1012 of FIG. 10, or a combination thereof.

Also for example, the object detector module 1208 can be implemented with the navigation system 1100 of FIG. 11. The object detector module 1208 can be implemented with the first user interface 1118 of FIG. 11, the first control unit 1112 of FIG. 11, the first software 1122 of FIG. 11, or a combination thereof.

The object detector module 1208 can include infrared (IR) or other technology for sensing the objects around the vehicle. The object detector module 1208 can provide information including depth of the objects.

The block diagram depicts a speed-distance estimator module 1210, which can include a function for estimating speed and distance of the objects around a vehicle with the navigation system 1200 therein. The speed-distance estimator module 1210 can be coupled to the three-dimensional depth processor module 1206 and the object detector module 1208.

For example, the speed-distance estimator module 1210 can be implemented with the first device 102 of FIG. 10. The speed-distance estimator module 1210 can be implemented with the location unit 1006 of FIG. 10, the control unit 1008 of FIG. 10, the software 1012 of FIG. 10, or a combination thereof.

Also for example, the speed-distance estimator module 1210 can be implemented with the navigation system 1100 of FIG. 11. The speed-distance estimator module 1210 can be implemented with the location unit 1120 of FIG. 11, the first control unit 1112 of FIG. 11, the first software 1122 of FIG. 11, or a combination thereof.

The speed-distance estimator module 1210 can receive depth information from the three-dimensional depth processor module 1206 or the object detector module 1208 with in-depth/three-dimensional cameras or two-dimensional cameras provided around the vehicle, respectively. The speed-distance estimator module 1210 can estimate speed and distance of the objects around the vehicle based on the depth information.

With GPS navigation information, speed of the vehicle, and relative distance of the objects, the speed-distance estimator module 1210 can detect how fast the vehicle approaching the objects. For example, the speed-distance estimator module 1210 can alert if it is not safe when the user is changing lane, based on relative distance other vehicles in the target lane.

The navigation system 1200 can be used in a vehicle without cameras and instead with just infrared (IR) object detectors mounted on one or more sides of the vehicle. When three-dimensional (3D) cameras are not available, with two-dimension (2D) camera feeds from the camera feed module 1204 via the three-dimensional depth processor module 1206 and information from the object detector module 1208, the speed-distance estimator module 1210 can simulate 3D camera feeds for estimating the speed and distance of the objects.

The speed-distance estimator module 1210 can detect objects in a surrounding view (e.g. the surrounding view 502). The objects can be detected at traffic lanes adjacent a vehicle (e.g. the vehicle 504 of FIG. 5) that includes the navigation system 1200.

The block diagram depicts a surrounding visual presentation module 1212 having a function for presenting a visual representation of the vehicle and the surrounding objects. The function can be performed by constructing a view of the vehicle and the surrounding based on the speed and relative distance of the surrounding objects. The surrounding visual presentation module 1212 can be coupled to the visual attention detector module 1202, the three-dimensional depth processor module 1206, and the speed-distance estimator module 1210.

For example, the surrounding visual presentation module 1212 can be implemented with the first device 102 of FIG. 10. The surrounding visual presentation module 1212 can be implemented with the control unit 1008 of FIG. 10, the software 1012 of FIG. 10, or a combination thereof.

Also for example, the surrounding visual presentation module 1212 can be implemented with the navigation system 1100 of FIG. 11. The surrounding visual presentation module 1212 can be implemented with the first control unit 1112 of FIG. 11, the first software 1122 of FIG. 11, or a combination thereof.

The surrounding visual presentation module 1212 can receive real time video from the camera feed module 1204 and speed and distance information of the surrounding objects from the speed-distance estimator module 1210 for generating a surrounding view. For example, the surrounding view can represent the surrounding view 204 of FIG. 2, the surrounding view 304 of FIG. 3, the surrounding view 404 of FIG. 4, the surrounding view 502 of FIG. 5, the surrounding view 604 of FIG. 6, the surrounding view 704 of FIG. 7, or the surrounding view 916 of FIG. 9.

The visual attention detector module 1202 can enable the surrounding visual presentation module 1212 to present the surrounding view based on the diverted attention state 902 of FIG. 9. The visual attention detector module 1202 can disable the surrounding visual presentation module 1212 to not present the surrounding view in the normal attention state 802 of FIG. 8.

The block diagram depicts an alert engine module 1214, which can include a function for producing a visual or audio alert. The alert engine module 1214 can be coupled to the visual attention detector module 1202, the camera feed module 1204, and the speed-distance estimator module 1210.

For example, the alert engine module 1214 can be implemented with the first device 102 of FIG. 10. The alert engine module 1214 can be implemented with the control unit 1008 of FIG. 10, the software 1012 of FIG. 10, or a combination thereof.

Also for example, the alert engine module 1214 can be implemented with the navigation system 1100 of FIG. 11. The alert engine module 1214 can be implemented with the first control unit 1112 of FIG. 11, the first software 1122 of FIG. 11, or a combination thereof.

The alert engine module 1214 can be enabled to produce a visual or audio alert by the visual attention detector module 1202 based on the diverted attention state 902 of FIG. 9. The alert engine module 1214 can be enabled to produce a visual or audio alert by the three-dimensional depth processor module 1206 or the speed-distance estimator module 1210 as the objects are close to the vehicle.

The alert engine module 1214 can generate an alert message with a detection of an object at or exceeding a threshold. For example, the vehicle 504 is detected in the surrounding view 502 with a speed that is at or exceeding a speed threshold.

The block diagram depicts a navigation application module 1216, which can include a function for presenting a navigation representation, a surrounding view, or a combination thereof. The navigation application module 1216 can be coupled to the visual attention detector module 1202, the speed-distance estimator module 1210, the surrounding visual presentation module 1212, and the alert engine module 1214.

For example, the navigation application module 1216 can be implemented with the first device 102 of FIG. 10. The navigation application module 1216 can be implemented with the location unit 1006 of FIG. 10, the control unit 1008 of FIG. 10, the software 1012 of FIG. 10, or a combination thereof.

Also for example, the navigation application module 1216 can be implemented with the navigation system 1100 of FIG. 11. The navigation application module 1216 can be implemented with the location unit 1120 of FIG. 11, the first control unit 1112 of FIG. 11, the first software 1122 of FIG. 11, or a combination thereof.

The navigation application module 1216 can generate navigation information along with the surrounding view from the surrounding visual presentation module 1212 based on the diverted attention state 902 of FIG. 9 as detected by the visual attention detector module 1202. The navigation application module 1216 can present the objects at a location relative to the vehicle based on the distance and speed information from the speed-distance estimator module 1210. The navigation application module 1216 can present the visual alert generated by the alert engine module 1214.

The navigation application module 1216 can allow users to query the landmark 710 of FIG. 7. The landmark 710 of FIG. 7 recognized in the surrounding view 704 of FIG. 7 can be displayed on the map screen 702 of FIG. 7 based on the relative distance 712 of FIG. 7 from the vehicle 706 of FIG. 7. The navigation application module 1216 can enable the users to query the landmark 710 of FIG. 7 by having the users click or select the landmark 710 of FIG. 7 on the map screen 702 of FIG. 7, allowing users to get more details without typing name or address of the landmark 710 of FIG. 7.

The block diagram depicts a visual presentation 1218, which can include navigation information, the surrounding view, and the visual alert. The visual presentation 1218 can be sent to the user interface 1002 of FIG. 10 or the first user interface 1118 of FIG. 11 for displaying on a device such as the first device 102 of FIG. 1, the first device 102 of FIG. 10, or the first device 1102 of FIG. 11.

The block diagram depicts an audio message 1220, which can include the audio alert produced based on the diverted attention state 902 of FIG. 9 or as the vehicle getting close to the objects. The audio message 1220 can be sent to the user interface 1002 of FIG. 10 or the first user interface 1118 of FIG. 11 for sounding on a device such as the first device 102 of FIG. 1, the first device 102 of FIG. 10, or the first device 1102 of FIG. 11.

The block diagram depicts a storage module 1222 for storing the real time video and GPS traces from the camera feed module 1204 and the navigation application module 1216, respectively. For example, the storage module 1222 can be implemented with the first device 102 of FIG. 10. The storage module 1222 can be implemented with the storage unit 1004 of FIG. 10, the control unit 1008 of FIG. 10, the software 1012 of FIG. 10, or a combination thereof.

Also for example, the storage module 1222 can be implemented with the navigation system 1100 of FIG. 11. The storage module 1222 can be implemented with the first storage unit 1114 of FIG. 11, the first control unit 1112 of FIG. 11, the first software 1122 of FIG. 11, the second storage unit 1126 of FIG. 11, the second control unit 1124 of FIG. 11, the second software 1132 of FIG. 11, or a combination thereof.

Storing data in the storage module 1222 can be supported up to the capacity of the storage module 1222. Storing data can include storing the real time video of the vehicle's surrounding and the GPS traces. The stored data can be useful for providing an actual footage and a map when reporting an accident. As an example, data stored in the storage module 1222 can include video of a vehicle's surrounding and GPS traces in the last thirty seconds at the time of an accident.

Figure 13:
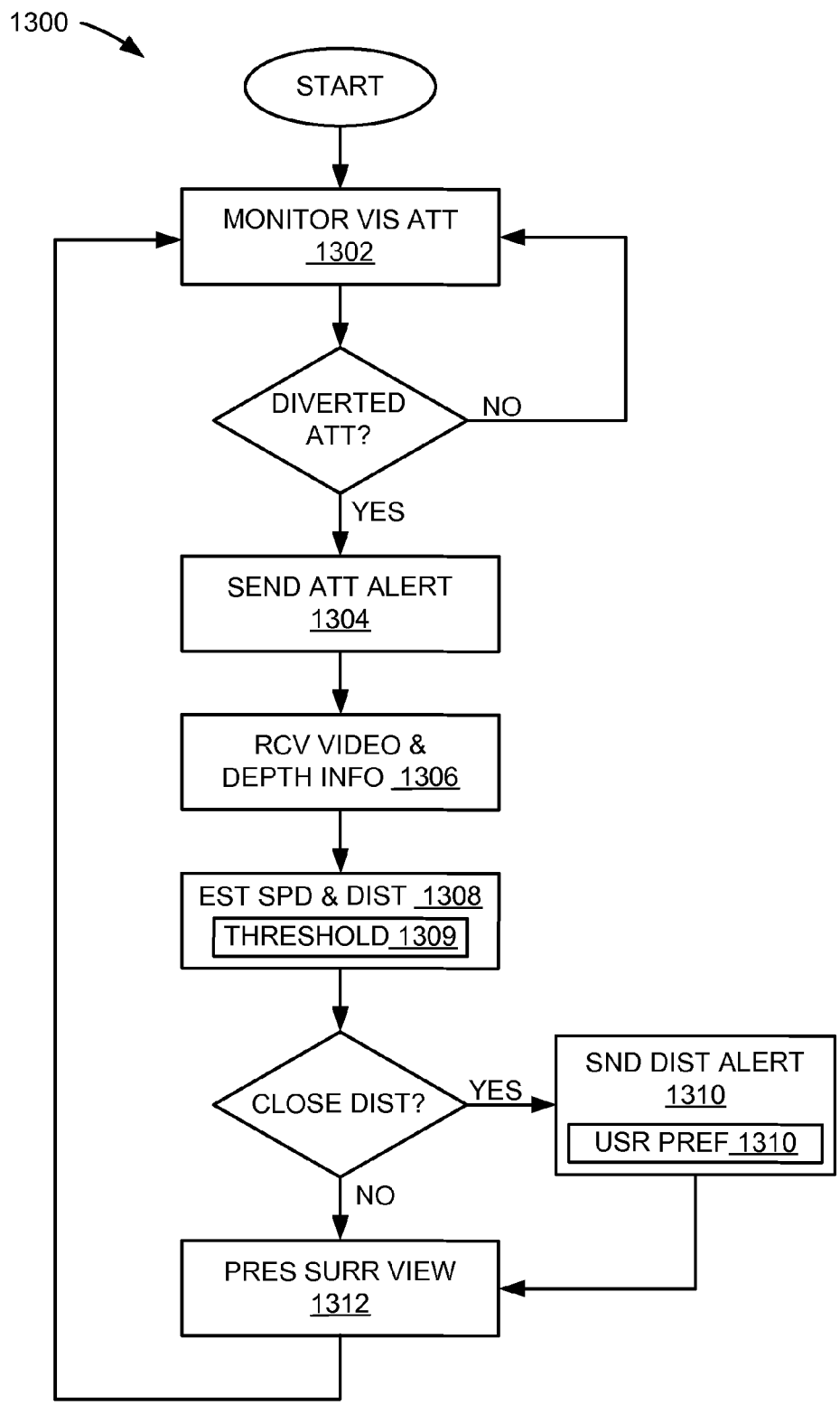
FIG. 13 is a flow chart of a navigation system with video in a fourth embodiment of the present invention.

Referring now to FIG. 13, therein is shown a flow chart of a navigation system 1300 with video in a fourth embodiment of the present invention. As an example, the navigation system 1300 can be operated by running the software 1012 of FIG. 10. As another example, the navigation system 1300 can be operated by running the first software 1122 of FIG. 11, the second software 1132 of FIG. 11, or a combination thereof.

The flow chart depicts the navigation system 1300 monitoring a user's visual attention in a module 1302, which can include the visual attention detector module 1202 of FIG. 12. Monitoring the user's visual attention can include sensing whether the user's attention 804 of FIG. 8 is in the normal attention state 802 of FIG. 8 or the user's attention 904 of FIG. 9 is in the diverted attention state 902 of FIG. 9. In the normal attention state 802 of FIG. 8, the user 806 of FIG. 8 can be detected as in a state of focusing on the road. The navigation system 1300 can continue to monitor the visual attention of the user 806 of FIG. 8.

In the diverted attention state 902 of FIG. 9, the user 908 of FIG. 9 can be detected as in a state of not focusing on the road. The navigation system 1300 can send an attention alert in a module 1304, which can include the alert engine module 1214 of FIG. 12. Sending the attention alert can include sending the visual presentation 1218 of FIG. 12 along with a visual alert message, the audio message 1220 of FIG. 12, or a combination thereof. Based on the diverted attention state 902 of FIG. 9, sending the attention alert can serve as a reminder to the user 908 of FIG. 9 to help him/her remain focused on the road.

Besides sending the attention alert, the navigation system 1300 can receive video data and depth information in a module 1306, which can include the camera feed module 1204 of FIG. 12, the three-dimensional depth processor module 1206 of FIG. 12, the object detector module 1208 of FIG. 12, or a combination thereof. The navigation system 1300 can estimate the relative distance 712 of FIG. 7, a speed, or a velocity of the object 708 of FIG. 7 surrounding the vehicle 706 of FIG. 7 in a module 1308, which can include the speed-distance estimator module 1210 of FIG. 12.

Estimating the relative distance 712 of FIG. 7, the speed, or the velocity of the object 708 of FIG. 7 can provide a sense of how close the vehicle 706 of FIG. 7 is to the object 708 of FIG. 7. This is particularly useful to know when the object 708 of FIG. 7 is nearby or out of sight of the user 908 of FIG. 9 based on the diverted attention state 902 of FIG. 9. Estimating the relative distance 712 of FIG. 7, the speed, or the velocity can be done based on the depth information.

With the relative distance 712 of FIG. 7, the speed, or the velocity of the objects nearby or surrounding the vehicle matches or is below or above a predetermined threshold 1309, the navigation system 1300 can send a distance alert message in a module 1310, which can include the three-dimensional depth processor module 1206 of FIG. 12 and the alert engine module 1214 of FIG. 12. The predetermined threshold 1309 can include a preset value to which the relative distance 712 of FIG. 7, the speed, or the velocity can be compared. The predetermined threshold 1309 can include a distance threshold, a speed threshold, a velocity threshold, or a combination thereof.

Comparing the relative distance 712 of FIG. 7, the speed, or the velocity to the predetermined threshold 1309, the navigation system 1300 can alert the user 806 of FIG. 8 or the user 908 of FIG. 9 of potential hazards in a surrounding view. For example, the navigation system 1300 can provide an alert of potential hazards including nearby objects that are detected and with a speed that is at or exceeding a speed threshold.

Sending the distance alert message can include sending an alert in the visual presentation 1218 of FIG. 12, the audio message 1220 of FIG. 12, or a combination thereof based on the diverted attention state 902 of FIG. 9 for indicating that the relative distance 712 of FIG. 7 is below the predetermined threshold 1309. The alert can also be provided based on a user's preference 1311. The user's preference 1311 can be configured to include a user's selectable option for indicating that the relative distance 712 of FIG. 7, the speed, or the velocity matches or is below or above the predetermined threshold 1309.

The navigation system 1300 can present the surrounding view in a module 1312, which can include the surrounding visual presentation module 1212 of FIG. 12 and the navigation application module 1216 of FIG. 12. Presenting the surround view can include presenting the surrounding view in the visual presentation 1218 of FIG. 12. The surrounding view can also be provided based on the user's preference 1311.

The surrounding view can include the surrounding view 204 of FIG. 2, the surrounding view 304 of FIG. 3, the surrounding view 404 of FIG. 4, the surrounding view 502 of FIG. 5, the surrounding view 604 of FIG. 6, the surrounding view 704 of FIG. 7, or the surrounding view 916 of FIG. 9. The surrounding view can be presented for displaying on a device, which can include the first device 102 of FIG. 1, the first device 102 of FIG. 10, or the first device 1102 of FIG. 11, based on the diverted attention state 902 of FIG. 9.

It has been discovered that the present invention provides the navigation system 1300 providing improved usability. The navigation system 1300 can provide improved usability in helping with safe driving while at the same time allowing users the benefit of GPS navigation systems. Helping with safe driving includes presenting a surrounding view, which can include the surrounding view 204 of FIG. 2, the surrounding view 304 of FIG. 3, the surrounding view 404 of FIG. 4, the surrounding view 502 of FIG. 5, the surrounding view 604 of FIG. 6, or the surrounding view 704 of FIG. 7, in the navigation system 1300. The surrounding view can provide an augmented view of a vehicle's surrounding that is better or at least equal to what a user would normally see if his attention is on the road.

It has been found that the present invention provides the navigation system 1300 providing improved user's friendly experience. The navigation system 1300 can provide improved user's friendly experience in sending a visual alert in the visual presentation 1218 of FIG. 12 and/or an audio alert in the audio message 1220 of FIG. 12 based on the diverted attention state 902 of FIG. 9. Sending the visual and audio alerts can improve the user's friendly experience particularly when the user's visual attention is momentarily diverted from focusing on the road to look or interact with the navigation system 1300 and thus can avoid potential accidents.

The physical transformation of the diverted attention state 902 of FIG. 9 to the surrounding view 204 of FIG. 2, the surrounding view 304 of FIG. 3, the surrounding view 404 of FIG. 4, the surrounding view 502 of FIG. 5, the surrounding view 604 of FIG. 6, the surrounding view 704 of FIG. 7, the visual presentation 1218 of FIG. 12, and the audio message 1220 of FIG. 12 results in movement in the physical world, such as people using the first device 102 of FIG. 1, the first device 102 of FIG. 10, the first device 1102 of FIG. 11, the navigation system 1200 of FIG. 12, the navigation system 1300, or vehicles, based on the operation of the navigation system 1300. As the movement in the physical world occurs, the movement itself creates additional information that is converted back to the data for further processing with the surrounding view 204 of FIG. 2, the surrounding view 304 of FIG. 3, the surrounding view 404 of FIG. 4, the surrounding view 502 of FIG. 5, the surrounding view 604 of FIG. 6, the surrounding view 704 of FIG. 7, the visual presentation 1218 of FIG. 12, and the audio message 1220 of FIG. 12 for the continued operation of the navigation system 1300 and to continue the movement in the physical world.

It has also been discovered that the present invention provides the navigation system 1300 providing flexibility. The navigation system 1300 can provide flexibility in supporting different camera feeds. The navigation system 1300 can be used in a vehicle without cameras and instead with just infrared (IR) object detectors mounted on one or more sides of the vehicle. When three-dimensional (3D) cameras are not available, using two-dimension (2D) camera feeds with IR object detectors can simulate 3D camera feeds. When 2D camera feeds and IR object detectors are not available for simulating 3D camera feeds, just showing real time video of the vehicle's surrounding can be useful for helping with safe driving.

Figure 14:
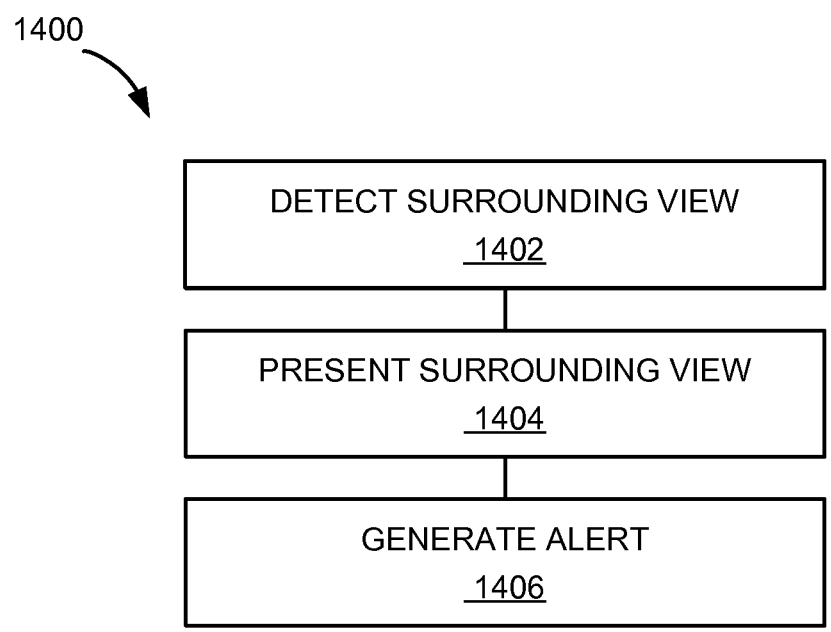
FIG. 14 is a flow chart of a method of operation of a navigation system with video in a further embodiment of the present invention.

Referring now to FIG. 14, therein is shown a flow chart of a method 1400 of operation of a navigation system with video in a further embodiment of the present invention. The method 1400 includes: detecting a surrounding view for detecting an object at a traffic lane to the left or the right of a device as well as in the front or at the rear of the device in a module 1402; presenting the surrounding view for displaying on the device in a module 1404; and generating an alert with a detection of the object at or exceeding a threshold in a module 1406.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    sensing a user's attention;
    detecting a diverted attention state of the user's attention for representing user's attention relative to front of a vehicle; and
    presenting a surrounding view including a front view, a rear view, a left view, and a right view based on the diverted attention state for displaying on a device.

2. The method as claimed in claim 1 wherein presenting the surrounding view includes simultaneously presenting the surrounding view and a main presentation view including a map screen, a search screen, or an input screen for displaying on the device.

3. The method as claimed in claim 1 wherein presenting the surrounding view includes displaying the surrounding view near the perimeter of the device.

4. The method as claimed in claim 1 further comprising selecting a landmark recognized in the surrounding view.

5. The method as claimed in claim 1 further comprising generating an alert of potential hazards in the surrounding view based on a user's preference.

6. A method of operation of a navigation system comprising:
    sensing a user's attention;
    detecting a diverted attention state of the user's attention for representing user's attention relative to front of a vehicle;
    presenting a surrounding view including a front view, a rear view, a left view, and a right view based on the diverted attention state for displaying on a device;
    detecting an object's position in the surrounding view; and
    generating an alert with a detection of the object at or exceeding a threshold based on a user's preference.

7. The method as claimed in claim 6 further comprising:
    providing an attention detector;
    wherein:
        sensing the user's attention includes sensing the user's attention with the attention detector.

8. The method as claimed in claim 6 wherein presenting the surrounding view includes displaying the surrounding view in a section of a screen.

9. The method as claimed in claim 6 further comprising clicking a landmark recognized in the surrounding view and displayed based on a relative distance.

10. The method as claimed in claim 6 wherein generating the alert includes sending an audio message, a visual presentation, or a combination thereof based on the user's preference for indicating that a relative distance of the object is below the threshold.

11. A navigation system comprising:
    a visual attention detector module for sensing a user's attention and detecting a diverted attention state of the user's attention for representing user's attention relative to front of a vehicle; and
    a surrounding visual presentation module, coupled to the visual attention detector module, for presenting a surrounding view including a front view, a rear view, a left view, and a right view based on the diverted attention state for displaying on a device.

12. The system as claimed in claim 11 wherein the surrounding visual presentation module is for simultaneously presenting the surrounding view and a main presentation view including a map screen, a search screen, or an input screen for displaying on the device.

13. The system as claimed in claim 11 wherein the surrounding visual presentation module is for displaying the surrounding view near the perimeter of the device.

14. The system as claimed in claim 11 further comprising a navigation application module, coupled to the surrounding visual presentation module, for selecting a landmark recognized in the surrounding view.

15. The system as claimed in claim 11 further comprising an alert engine module, coupled to the surrounding visual presentation module, for generating the alert of potential hazards in the surrounding view based on a user's preference.

16. The system as claimed in claim 11 further comprising:
an object detector module, coupled to the surrounding visual presentation module, for detecting an object's position in the surrounding view;
an alert engine module, coupled to the object detector module, for generating the alert with the detection of the object at or exceeding the threshold based on a user's preference.

17. The system as claimed in claim 16 wherein the visual attention detector module is for providing an attention detector and sensing the user's attention with the attention detector.

18. The system as claimed in claim 16 wherein the surrounding visual presentation module is for displaying the surrounding view in a section of a screen.

19. The system as claimed in claim 16 further comprising a navigation application module, coupled to the surrounding visual presentation module, for clicking a landmark recognized in the surrounding view and displayed based on a relative distance.

20. The system as claimed in claim 16 wherein the alert engine module is for sending an audio message, a visual presentation, or a combination thereof based on the user's preference for indicating that a relative distance of the object is below the threshold.

* * * * *